April 24, 1956 L. O. BADDERS 2,743,133
CROP SPRAYER, INCLUDING IMPROVED SPRAY BOOM MOUNT
Filed Nov. 21, 1952 5 Sheets-Sheet 1
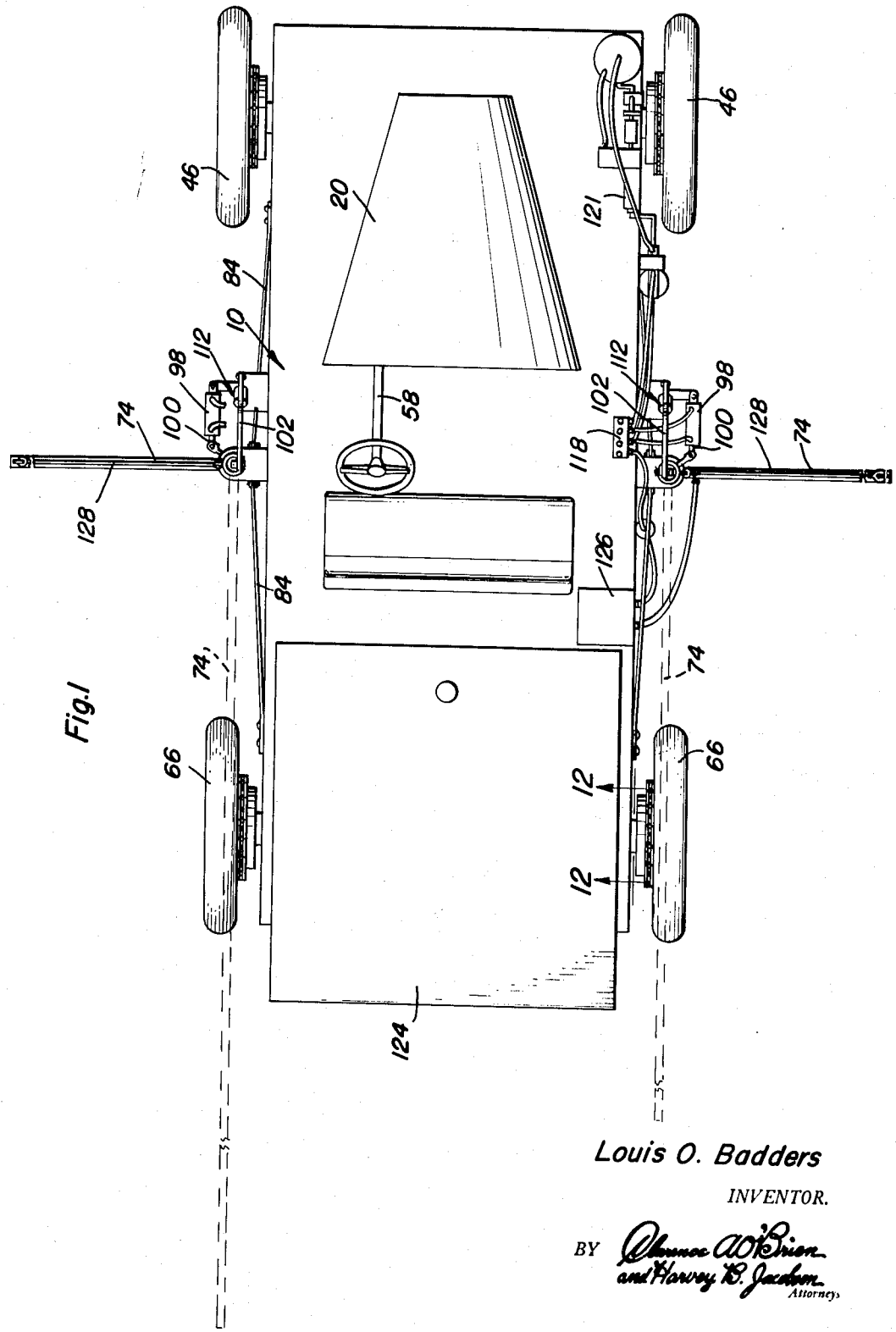
Louis O. Badders
INVENTOR.

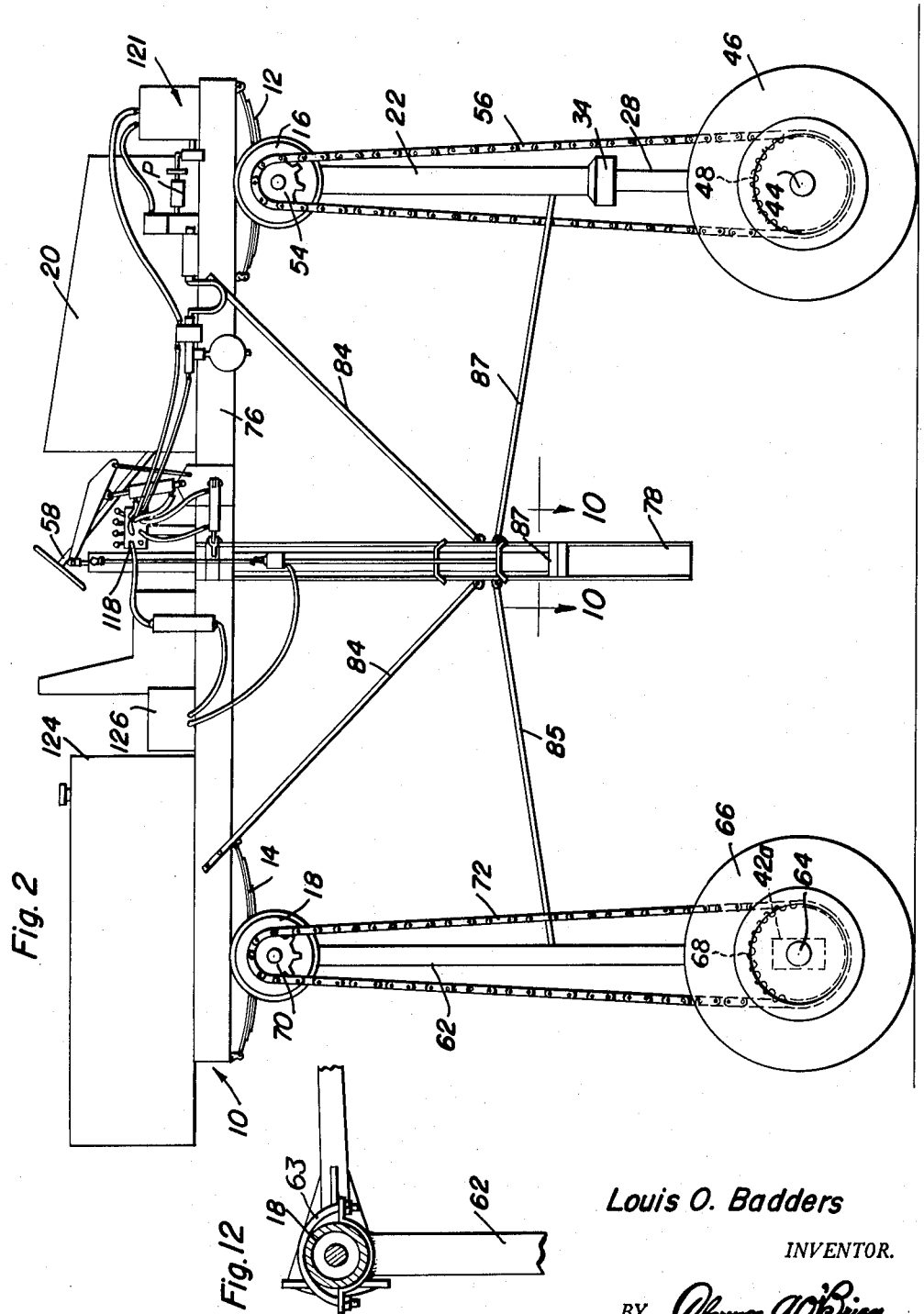

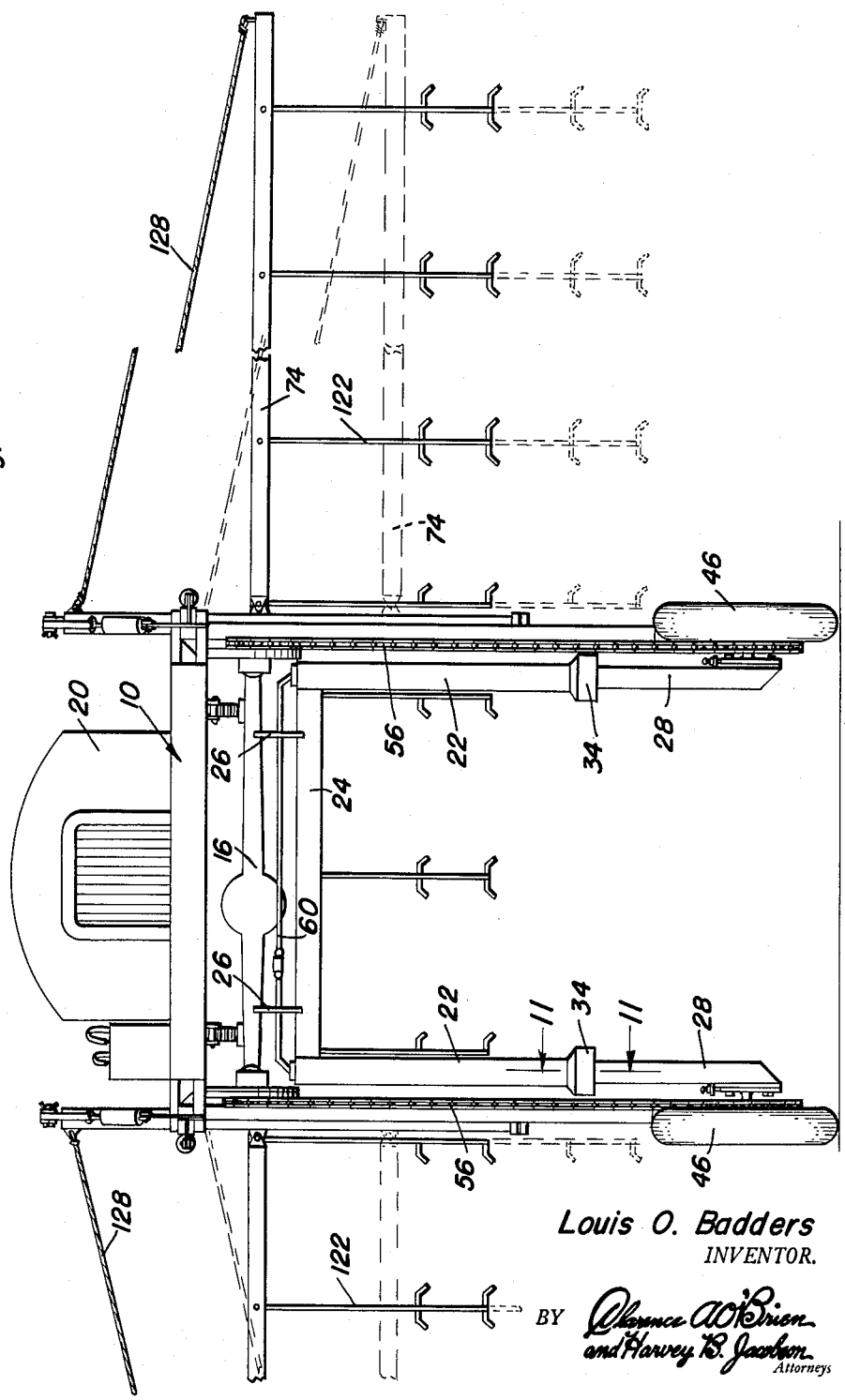

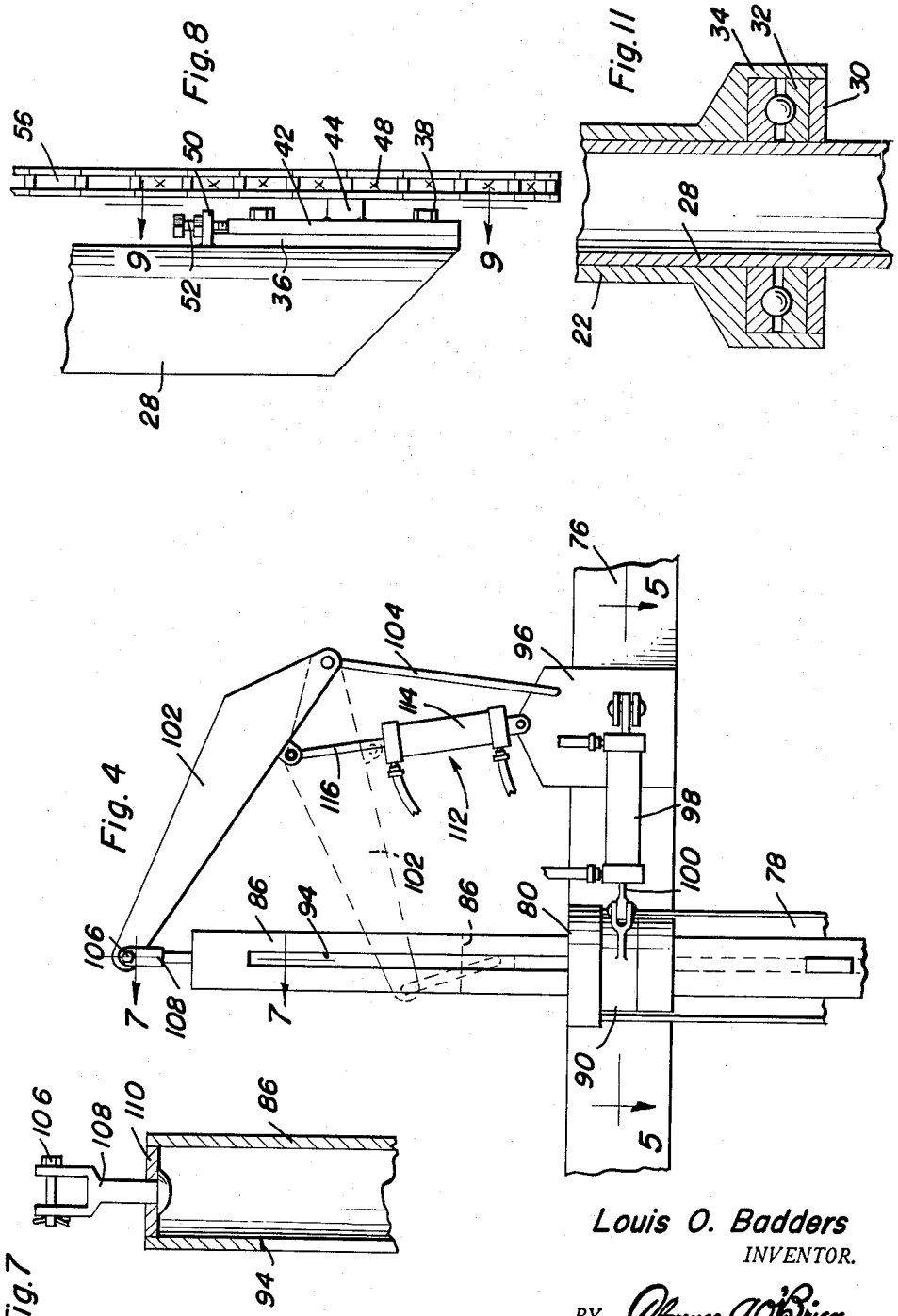

April 24, 1956　　　　L. O. BADDERS　　　　2,743,133
CROP SPRAYER, INCLUDING IMPROVED SPRAY BOOM MOUNT
Filed Nov. 21, 1952　　　　　　　　　　　　5 Sheets-Sheet 5
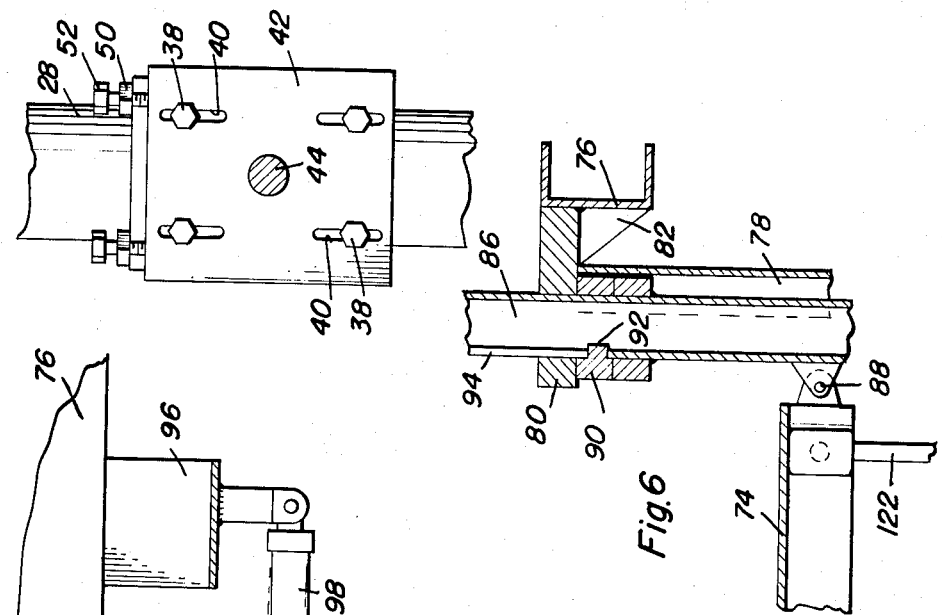
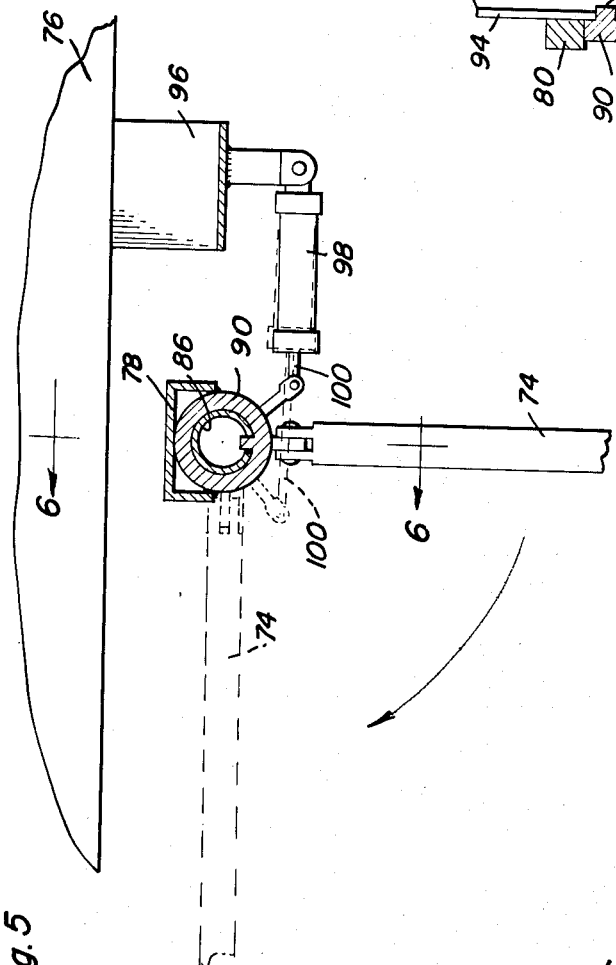
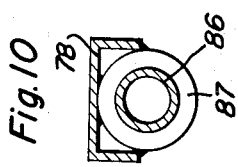
Louis O. Badders
INVENTOR.

United States Patent Office 2,743,133
Patented Apr. 24, 1956

2,743,133

CROP SPRAYER, INCLUDING IMPROVED SPRAY BOOM MOUNT

Louis O. Badders, Pomona, Calif.

Application November 21, 1952, Serial No. 321,881

8 Claims. (Cl. 299—39)

This invention relates to new and useful improvements in crop spraying apparatus and the primary object of the present invention is to provide a power driven wheeled frame having a vertically adjustable spray boom mount, whereby crops of various heights may be sprayed in a convenient manner.

Another important object of the present invention is to provide a crop sprayer including a frame supported vertical guide, a boom supporting member slidably and rotatably carried by the guide and means operatively connected to the supporting member whereby the member may be raised and lowered and also rotated to locate a boom on the member at a desired height and parallel to or inclined relative to the direction of travel of the frame on which the member is supported.

Yet another object of the present invention is to provide a crop sprayer including an elevated frame having forward and rear pairs of supporting wheels all of which are operatively connected to a power plant on the frame to prevent bogging down of the sprayer in mud or soft soil.

A further object of the present invention is to provide a crop spraying machine including a pair of vertically slidable and rotatable boom supporting members that are connected to hydraulically actuated means, whereby the members may be raised or lowered for crops of various heights and wherein the members may be disposed alongside of the machine when not in use or laterally of the machine when the spray booms on the members are in use.

A still further aim of the present invention is to provide a crop spraying machine of the aforementioned character that is extremely simple and practical in construction, strong and reliable in use, efficient and durable in operation, inexpensive to manufacture, service and maintain, and otherwise well adapted for the purposes for which the same is intended.

Other objects and advantages reside in the details of construction and operation as more fully hereinafter described and claimed, reference being had to the accompanying drawings forming part hereof, wherein like numerals refer to like parts throughout, and in which:

Figure 1 is a top plan view of the present invention and showing the spray booms in their crop spraying position, and with dotted lines showing the booms alongside of the frame and in their unused position;

Figure 2 is a side elevational view of Figure 1;

Figure 3 is a front elevational view of Figure 2;

Figure 4 is an enlarged fragmentary view of Figure 2 and showing the boom mounting means with the operating lever shown raised by full lines and lowered by dotted lines;

Figure 5 is a horizontal sectional view taken substantially on the plane of section line 5—5 of Figure 4;

Figure 6 is a vertical sectional view taken substantially on the plane of section line 6—6 of Figure 5;

Figure 7 is an enlarged detail vertical sectional view taken substantially on the plane of section line 7—7 of Figure 4;

Figure 8 is an enlarged fragmentary view of Figure 3 to illustrate one of the forward wheel mounts;

Figure 9 is a vertical sectional view taken substantially on the plane of section line 9—9 of Figure 8;

Figure 10 is an enlarged horizontal sectional view taken substantially on the plane of section line 10—10 of Figure 2;

Figure 11 is an enlarged detail vertical sectional view taken substantially on the plane of section line 11—11 of Figure 3; and, Figure 12 is an enlarged vertical sectional view taken substantially on the plane of section line 12—12 of Figure 1 to illustrate the manner in which the rear posts are attached to the rear axle housing.

Referring now to the drawings in detail, wherein for the purpose of illustration, there is disclosed a preferred embodiment of the present invention, the numeral 10 represents an elongated frame whose ends support forward and rear leaf springs 12 and 14 that are centrally attached to forward and rear axle housings 16 and 18. A power plant 20 supported on the frame 10 is operatively connected to the axles within the forward and rear axle housings to rotate the axles.

Forward wheel mounts support the forward end of frame 10. The forward mounts include upper vertical tubes or column sections 22 whose upper ends are connected by a rigid transverse beam or cross member 24 that is fixed under the forward axle housing 16 by hangers 26. The upper portions of inner column sections or tubes 28 extend upwardly through the tubes 22 and fixedly support rings 30 on which bearing races 32 are disposed. The bearing races 32 are recived within the enlarged lower end portions 34 of the tubes 22 to permit rotation of the tubes 28 in the tubes 22 in a smooth unrestricted manner.

The lower ends of tubes 28 fixedly support vertical plates 36 that are formed with internally threaded horizontal apertures receivably engaging bolts 38. Bolts 38 extend through vertical slots 40 in plates 42 to clamp plates 42 against the plates 36 in order to vertically adjust the plates 42 for a purpose presently to be described.

Stub axles 44 are fixed to and project horizontally outwardly from the plates 42. The stub axles 44 rotatably support forward wheels 46 having sprockets 48 fixed thereto. Horizontal ears 50 fixed to the upper portions of plates 36 are provided with internally threaded apertures that receivably engage set screws 52 engaging the upper ends of the plates 42 to vertically adjust the plates 42 relative to the plates 36.

The axle sections in axle housing 16 are connected by drive universal couplings to upper sprockets 54 that remain coplanar with sprockets 48 through rotation of tubes 28 within tubes 22. Sprockets 54 are connected to sprockets 48 by endless sprocket chains 56 and the tension of these sprocket chains is regulated by the combined function of the bolts 38 and set screws 52 permitting vertical adjustment of the stub axle carrying plates 42.

The power plant 20 being of known structure such as a tractor engine is provided with a steering column 58 that is connected to the upper ends of the tubes 28 by steering arms or links 60, whereby the tubes 28 may be rotated as a unit to permit turning of the wheels 46 for steering of the frame.

The upper ends of the rear wheel mounts or vertical posts 62 are clampingly attached by brackets 63 to the rear axle housing 18. The lower ends of the posts 62 fixedly support plates, similar to plates 36, that vertically, slidably and adjustably support plates 42a similar to plates 42, in the same manner as the plates 42a are secured to the plates 36. The plates 42 fixedly carry horizontal stub axles 64 on which rear wheels 66 are rotatably supported.

Sprockets 68 secured to the wheels 66 are connected to sprockets 70 on the outer ends of the axle sections in housing 18 by endless sprocket chains 72. The tension of chains 72 is varied by vertical adjustment of the plates 42a.

Spray booms 74 are mounted on the longitudinal side members 76 of the frame 10. The mounts for these spray booms are identical and each includes a vertical guide or channel 78 having a ring 80 fixed to its upper end and the rings 80 are permanently attached to the side members 76 and to reinforcing webs 82 welded to the side members. Braces 84 connect the channels 78 to the side members, rear braces 85 connect the lower portions of the channels 78 to the tubes 22, as shown in Figure 2.

Guides 87 are fixed within the lower portions of the channels 78 and coact with the rings 80 in slidably and rotatably receiving boom supporting members or tubes 86 to which the booms 74 are vertically swingably attached as at 88 (Figure 6).

Collars 90 are rotatable within the upper end portions of channels 78 and include radially inwardly projecting lugs 92 that enter vertical slots or keyways 94 in the tubes 86 about which the collars 90 are disposed.

Brackets 96 are fixed to the side members 76 adjacent and forwardly of the upper ends of the channels 78. These brackets 96 horizontally swingably support fluid motors or cylinders 98 having rods 100 pivotally attached to the collars 90, whereby the collars may be rotated to effect rotation of the tubes 86.

The rear ends of elongated rock levers 102 are attached to the brackets 96 by pitmans 104. The forward ends of the levers 102 are pivotally attached by pins 106 to bifurcated elements 108 rotatably supported by plates 110 fixed in the upper ends of the tubes 86. Fluid pressure motors 112 include cylinders 114 that are vertically swingably attached to brackets 96 and piston rods 116 that are pivotally attached to intermediate portions of the levers 102, whereby the levers 102 may be rocked about the pitman 104 to selectively raise and lower the tubes 86.

A control panel 118 is supported on frame 10 and is provided with a series of suitable two-way valves one of which is operatively connected to each cylinder 98 and other of which is operatively connected to the cylinders 114. The valves are provided with handles, such as 120 whereby the piston rods 100, 116 may be moved longitudinally relative to their cylinders. The inlet sides of the various valves are operatively connected, by suitable means, to the hydraulic system of the power plant 20 or to a pump P operated by the power plant whereby fluid under pressure may be directed through the valves to actuate the fluid motors.

The booms 74 support longitudinally spaced hangers 122 to which suitable spray nozzles, not shown, are suitably attached by clamp brackets or the like. The spray nozzles are operatively connected to a tank 124 on the frame 10 through the medium of a valve on the control panel and a pump 126 operatively engaged with the power plant.

Flexible guy lines or braces 128 are terminally attached to the outer ends of the booms 74 and the upper ends of the tubes 22 to maintain the booms perpendicular to the tubes 22 and in a horizontal position.

Having described the invention, what is claimed as new is:

1. In a crop sprayer including a supporting wheeled frame, a vertical channel secured to the frame, a collar rotatably mounted at the upper end of the channel and having a radially projecting key, a spray boom supporting the tube slidably received in the collar and having a longitudinal keyway receiving the key, a spray boom attached to said supporting tube, means connected to the tube and supported on the frame for selectively raising and lowering the tube, and means connected to the collar for rotating the collar.

2. In a crop sprayer including a supporting wheeled frame, a vertical channel secured to the frame, a collar rotatably mounted at the upper end of the channel and having a radially projecting key, a spray boom supporting tube slidably received in the collar and having a longitudinal keyway receiving the key, a spray boom attached to said supporting tube, means connected to the collar for rotating the same, a bracket secured to the frame, a lever terminally pivotally attached to the upper end of the tube and the bracket, and means connected to the bracket and an intermediate portion of the lever for selectively raising and lowering tube.

3. In a crop sprayer including a supporting wheeled frame, a vertical channel secured to the frame, a collar rotatably mounted at the upper end of the channel and having a radially projecting key, a spray boom supporting tube slidably received in the collar and having a longitudinal keyway receiving the key, a spray boom attached to said supporting tube, means connected to the collar for rotating the same, a bracket secured to the frame, a lever terminally pivotally attached to the upper end of the tube and the bracket, and means connected to the bracket and an intermediate portion of the lever for selectively raising and lowering tube, said means connected to the bracket and an intermediate portion of the lever comprising a fluid pressure means.

4. In a crop sprayer including a supporting wheeled frame, a vertical channel secured to the frame, a collar rotatably mounted at the upper end of the channel and having a radially projecting key, a spray boom supporting tube slidably received in the collar and having a longitudinal keyway receiving the key, a spray boom attached to said supporting tube, means connected to the collar for rotating the same, a bracket secured to the frame, a lever terminally pivotally attached to the upper end of the tube and the bracket, and means connected to the bracket and an intermediate portion of the lever for selectively raising and lowering tube, said means connected to the collar for rotating the same comprising a fluid pressure motor pivotally connected to the bracket and the collar.

5. In a crop sprayer including a wheeled frame having a pair of side members, a vertical channel secured to each of said members, guides fixed in each channel, a vertically slidable and rotatable spray boom supporting tube in each channel and received by the guides of each channel, a spray boom attached to each supporting tube, a rotatable collar at the upper end of each channel, each collar having a radially inwardly projecting lug, said tubes having vertical keyways receiving the lugs, means connected to the collars for rotating the same, and means attached to the upper ends of the tubes and carried by the side members for selectively raising and lowering the tubes.

6. In a crop sprayer including a wheeled frame having a pair of side members, a vertical channel secured to each of said members, guides fixed in each channel, a vertically slidable and rotatable spray boom supporting tube in each channel and received by the guides of each channel, a spray boom attached to each supporting tube, a rotatable collar at the upper end of each channel, each collar having a radially inwardly projecting lug, said tubes having vertical keyways receiving the lugs, brackets secured to the side members, a pair of vertically swingable levers terminally pivotally attached to the brackets and the upper ends of the tubes, fluid motors connecting the levers to the brackets and constituting means for imparting vertical swinging movement to the levers for selectively raising and lowering the tubes, and fluid pressure actuated means on the brackets and connected to the collars for rotating the latter.

7. In a crop spraying machine including an elongated wheeled frame, a spray boom mounting means comprising a vertical guide fixed to the frame, a vertically slidable member carried by the guide, a bracket secured to the frame, fluid pressure actuated means on the bracket and connected to the upper end of the member for selectively raising and lowering the member, a spray boom attached to the member and raised and lowered with the member, flexible braces between the boom and the guide for retaining the boom perpendicular to the member, and means connected to the member for rotating the member to selectively position the boom alongside of or perpendicular to the frame.

8. In a crop spraying machine included an elongated wheeled frame, a spray boom mounting means comprising a vertical guide fixed to the frame, a vertically slidable member carried by the guide, a bracket secured to the frame, fluid pressure actuated means on the bracket and connected to the upper end of the member for selectively raising and lowering the member, a spray boom attached to the member and raised and lowered with the member, flexible braces between the boom and the guide for retaining the boom perpendicular to the member, a rotary collar at the upper portion of said guide, a lug attached to and disposed radially inwardly of the collar, said member having a vertical slot receiving the lug, and means attached to the collar for rotating the collar to position the boom alongside of the perpendicular to the frame.

References Cited in the file of this patent

UNITED STATES PATENTS

| | | | |
|---|---|---|---|
| Re. 11,736 | Twining | Apr. 25, | 1899 |
| 549,809 | Mesta | Nov. 12, | 1895 |
| 2,221,433 | Pitner | Nov. 12, | 1940 |
| 2,305,913 | Troyer | Dec. 22, | 1942 |
| 2,548,482 | Kouril | Apr. 10, | 1951 |
| 2,626,069 | Jones | Jan. 20, | 1953 |
| 2,647,795 | Kucera | Aug. 4, | 1953 |
| 2,655,405 | Lattner | Oct. 13, | 1953 |